Figures 1, 2:
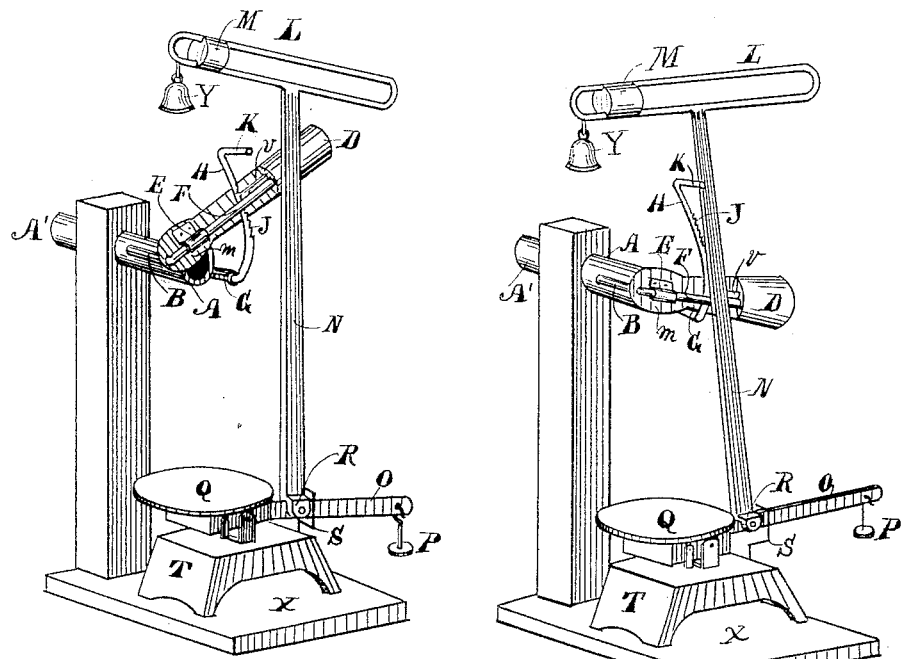

J. J. BISHOP.
Self-Closing Faucet and Measuring Attachment
No. 214,018. Patented April 8, 1879.

UNITED STATES PATENT OFFICE.

JOHN J. BISHOP, OF ELIZABETHTOWN, INDIANA.

IMPROVEMENT IN SELF-CLOSING FAUCET AND MEASURING ATTACHMENT.

Specification forming part of Letters Patent No. 214,018, dated April 8, 1879; application filed February 24, 1879.

*To all whom it may concern:*

Be it known that I, JOHN J. BISHOP, of Elizabethtown, in the county of Bartholomew and State of Indiana, have invented a new and useful Improvement in Self-Closing Faucet and Measuring Attachment, of which the following is a description, reference being had to the accompanying drawings.

My invention relates to a measuring device for fluids, such as molasses, oils, &c., and a faucet adapted to be closed or shut off by the action of the measuring device when the desired quantity of fluid has been drawn.

My invention consists of the new construction and arrangement of parts, and in the new combination of elements, whereby fluids are measured and the faucet closed by the action of the measuring devices when the desired amount of fluid has been drawn, as will be hereinafter fully described in the specification, and set forth in the accompanying claims.

In the accompanying drawings, in which like letters of reference in the different figures indicate like parts, Figure 1 represents a perspective view of my improved liquid-measuring device and self-closing faucet, showing the faucet open and the measuring device in position to effect the closing of the faucet when the required quantity of fluid has been drawn. Fig. 2 represents a perspective view of the same with the faucet closed.

A A' represent any ordinary faucet, the end A' being inserted in the barrel or vessel containing the fluid to be drawn. (In the drawings the faucet is represented as supported in an upright standard instead of a barrel.) The front end of the faucet is provided with the ordinary cut-off or gate *m*. Said gate is hinged to the faucet A at B. The gate *m* is provided with a long arm or weighted lever-handle, D, and with a rod or bar, F, parallel with the lever part of the gate. The bar F is located at a sufficient distance from the gate to permit the curved ratchet-trigger H J K to operate between them.

The trigger H is of peculiar construction, to wit: The lower part is provided with a bent end, to act as a journal, and operates in the bracket-bearing G, attached to the faucet. The part H curves upward, and is provided with notches or ratchet-teeth J. The upper end, K, is bent forward, forming a crank-arm for the lever N of the weighing apparatus to strike against.

Attached to the front of the gate *m*, above the bar F and between said bar and gate, is a dog or stationary pawl, *v*, having a beveled end, that engages with the notches J of the trigger H, in such a manner as to hold the weighted lever-gate *m* D open when said gate is raised and the trigger H moved forward, so as to engage the notches J with said pawl or dog *v*.

The weighing or measuring apparatus may be of any ordinary form of scales, having a beam, O, and a pendant, P, for receiving various weights, as required.

To the beam O is attached by a clamp or set-screw, R, an upright arm or lever, N, the upper end of which is provided with a balance-weight guide, L, and sliding weight M. Said weight is designed to balance the platform Q and vessels placed thereon, as follows, to wit: A vessel (not shown) is placed on the platform Q of the scales. The weight M is then adjusted in the guide L, either forward or backward, until the scales with the vessel are balanced, the arm N retaining a vertical position. The required weight—*i. e*, one equivalent to the required quantity of fluid to be drawn—is then placed on the pendant P, or, if a sliding weight is used on the graduated beam O, it is adjusted to the required weight. The weighted arm D of the gate *m* is raised, and the trigger H K moved forward until the notches J engage with the pawl *v*, as shown in Fig. 1. The fluid is then allowed to flow into the vessel on the platform Q until the required measure by weight has been drawn. Then the platform Q falls, and the vertical arm or lever N is tilted forward, the weight M giving it a quick motion. The arm N then strikes the bent end K of the trigger H J, and disengages the notches or ratchets J from the pawl *v*. The weight D then causes the gate *m* to be suddenly closed, cutting off any further flow of the fluid, as shown in Fig. 2. The scale-beam O is prevented from rising or falling too far by the stop S.

The weight-guide L or lever N may be provided with an alarm-bell, to indicate the time when the gate has been closed. Thus, if the bell Y is attached to the guide L, as shown, the sudden movement of the lever N and guide L forward when the platform Q falls causes the bell to ring.

It is obvious that the bell may be attached to the faucet A, and caused to ring by being struck with the end of the guide L, or by other parts of the moving arm N or trigger H.

What I claim as new, and desire to secure by Letters Patent, is—

1. The faucet A, having a cut-off or gate, $m$, provided with a long weighted arm or lever, D, and further provided with the parallel rod F and stationary pawl $v$, combined with the curved trigger H, having notches or ratchets J, and a crank-arm, K, as and for the purpose specified.

2. In combination with the faucet A, having a cut-off or gate, $m$, provided with a long weighted arm or lever, D, the pawl $v$, curved trigger H, with arm K and ratchets J, and the lever N, attached to the scale-beam, as and for the purpose specified.

3. In combination with the beam O of a scale, the upright arm N, having a guide, L, at its upper end, provided with an adjustable weight, M, as and for the purpose specified.

4. In combination with a beam-scale, T Q O, the lever N, having a guide, L, the weight M, the trigger H K J, the cut-off or gate $m$ of a faucet having a weighted lever arm, D, as and for the purpose specified.

In testimony whereof I have signed my name to this specification in the presence of two subscribing witnesses.

JOHN J. BISHOP.

Witnesses:
  E. O. FRINK,
  JAMES L. BISHOP.